United States Patent [19]

Hoffman et al.

[11] 3,862,125

[45] Jan. 21, 1975

[54] N,N-DIMETHYL-O-[ALKYL-3-ALKYLMERCAPTO-1,2,4-TRIAZOLYL(5)]-CARBAMIC ACID ESTERS

[75] Inventors: Hellmut Hoffman, Wuppertal; Ingeborg Hammann, Cologne, both of Germany

[73] Assignee: Bayer Aktiengesellschaft, Leverkusen, Germany

[22] Filed: Sept. 19, 1973

[21] Appl. No.: 398,628

[30] Foreign Application Priority Data
Oct. 14, 1972  Germany............................ 2250572

[52] U.S. Cl...... 260/308 R, 260/308 C, 260/481 C, 424/269
[51] Int. Cl............................................ C07d 55/06
[58] Field of Search................................. 260/308 R

[56] References Cited
UNITED STATES PATENTS
3,794,661  2/1974  Boehner et al.................. 260/308 R FOREIGN PATENTS OR APPLICATIONS
281,946  7/1952  Switzerland...................... 260/308 R
681,376  10/1952  Great Britain.................... 260/308 R

*Primary Examiner*—Alton D. Rollins
*Attorney, Agent, or Firm*—Burgess, Dinklage & Sprung

[57] ABSTRACT

N,N-dimethyl-O-[alkyl-3-alkylmercapto-1,2,4-triazolyl(5)]-carbamic acid esters of the formula

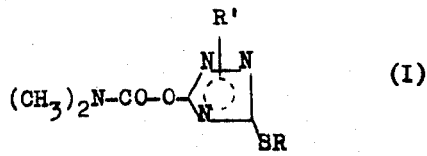

in which
R and R' each independently is alkyl of 1 to 6 carbon atoms,
which possess insecticidal and acaricidal properties.

7 Claims, No Drawings

N,N-DIMETHYL-O-[ALKYL-3-ALKYLMERCAPTO-1,2,4-TRIAZOLYL(5)]-CARBAMIC ACID ESTERS

The present invention relates to and has for its objects the provision of particular new N,N-dimethyl-O-[alkyl-3-alkylmercapto-1,2,4-triazolyl(5)]-carbamic acid esters, i.e., N,N-dimethyl-O-[1-, 2- or 4-alkyl-3-alkylmercapto-1,2,4-triazolyl(5)]-carbamic acid esters, which possess insecticidal and acaricidal properties, active compositions in the form of mixtures of such compounds with solid and liquid dispersible carrier vehicles, and methods for producing such compounds and for using such compounds in a new way especially for combating pests, e.g., insects and acarids, with other and further objects becoming apparent for a study of the within specification and accompanying examples.

It has been disclosed in Swiss Pat. No. 282,655 that pyrazolylcarbamic acid esters, such as N,N-dimethyl-O-[1-phenyl-3-methylpyrazolyl(5)]-carbamic acid ester (Compound A), possess insecticidal properties.

The present invention provides, as new compounds, the N,N-dimethyl-O-triazolyl-carbamic acid esters of the general formula

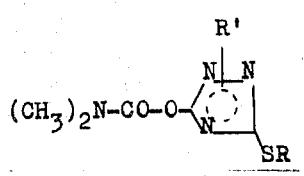

(I)

in which
R and R' each independently is alkyl of 1 to 6 carbon atoms.

The compounds of the present invention are distinguished by strong insecticidal and acaricidal properties.

Preferably, R is straight-chain or branched lower alkyl of 1 to 4 carbon atoms and R' is methyl, ethyl or isopropyl.

Surprisingly, the N,N-dimethyl-O-triazolyl-carbamic acid esters according to the invention show a substantially greater insecticidal and acaricidal action than the prior-art pyrazolylcarbamic acid esters of analogous structure and identical type of action. Accordingly, the products according to the present invention represent a genuine enrichment of the art.

The present invention also provides a process for the preparation of an N,N-dimethyl-O-triazolyl-carbamic acid ester of the formula (I) above, in which
a. a triazolyl derivative of the general formula

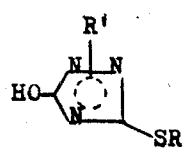

(II), in which
R and R' have the above-mentioned meanings,
is reacted, in the form of an alkali metal, alkaline earth metal or ammonium salt thereof or in the presence of an acid-binding agent, with N,N-dimethylcarbamic acid chloride, of the formula $$(CH_3)_2N-CO-Cl$$

in the presence of a diluent, or
b. a triazolyl derivative of the formula (II) above is converted, in a first stage, with an excess of phosgene into the corresponding chloroformic acid ester, and the latter is reacted, in a second stage, with dimethylamine, or
c. a triazolyl derivative of the formula (II) above is reacted, in a first stage, with an equivalent amount of phosgene to give the corresponding bis-(triazolyl)-carbonate and the latter is split with dimethylamine in a second stage.

If N,N-dimethylcarbamic acid chloride and 1-methyl-3-ethylmercapto-5-hydroxy-triazole-(1,2,4) are used as starting materials, the course of the reaction can be represented by the following equation:

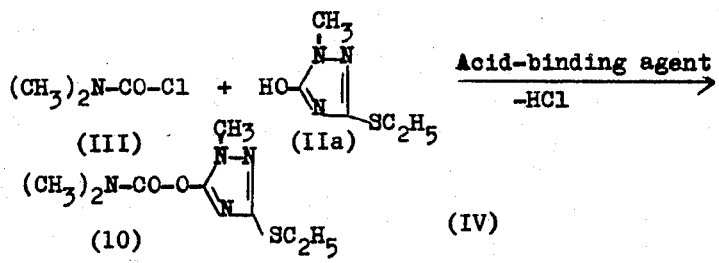

The N,N-dimethyl-carbamic acid chloride to be used as a starting material is known from the literature and can be prepared according to known processes.

The triazole derivatives of the formula (II), some of which are new, can be prepared according to processes which are known in principle, if the known thiosemicarbazide derivatives of the general formula

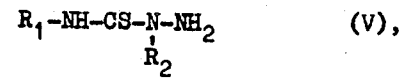

in which
$R_1$ and $R_2$ each denotes hydrogen or alkyl of 1 to 6 carbon atoms,
are reacted with pyrocarbonic acid diethyl esters, or the carbonic acid hydrazide derivatives of the general formula

are reacted with potassium thiocyanate, to give the intermediate products of the general formula

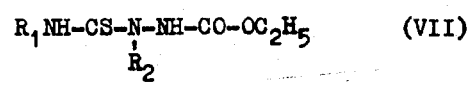

and these are then cyclized in a first stage and alkylated in a second stage, or cyclized and alkylated in one stage, for example according to the following equations.

(i) $R_1 = R_2 = H$

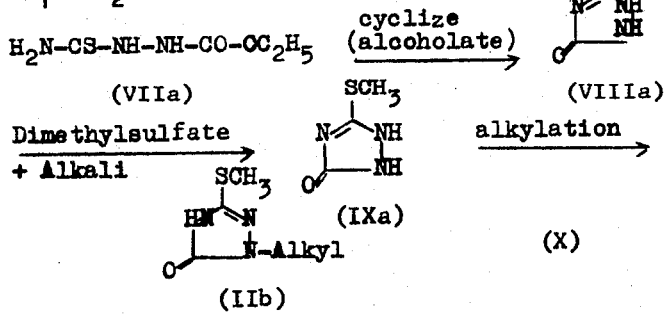

(ii) $R_1 = $ alkyl; $R_2 = H$

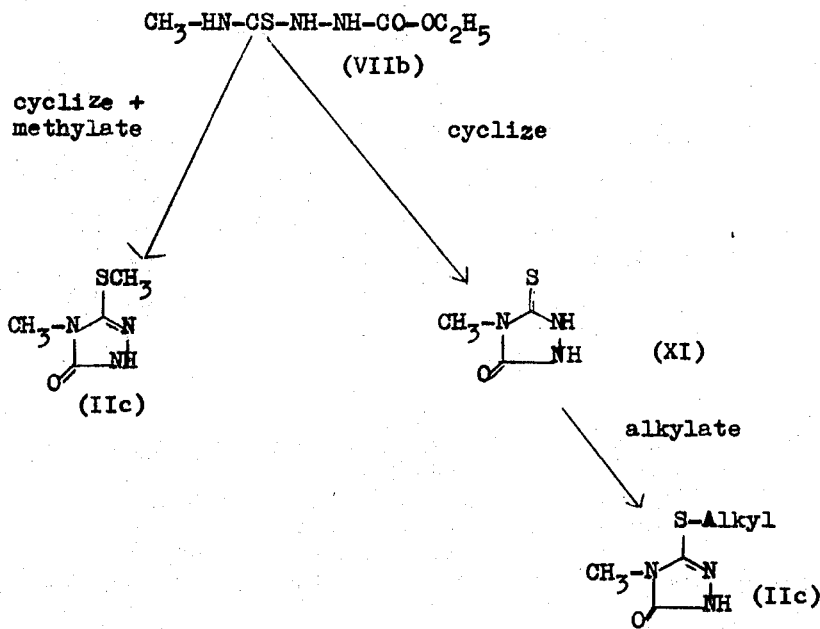

(iii) $R_1 = H$; $R_2 = $ alkyl

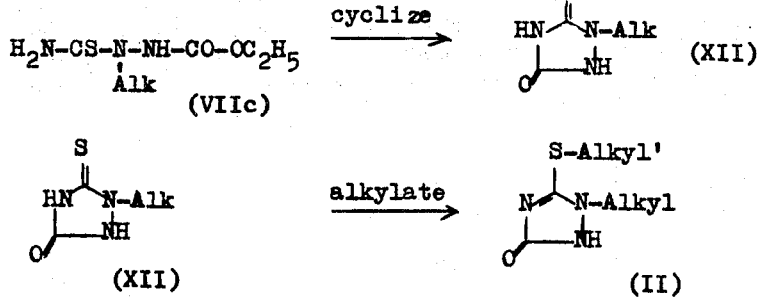

The following may be mentioned as examples of the triazolyl derivatives to be reacted according to the process: 3-methylmercapto-, 3-ethylmercapto-, 3-n-propylmercapto-, 3-isopropylmercapto-, 3-n-butylmercapto-, 3-isobutylmercapto-, 3-sec.-butylmercapto- and 3-tert.-butylmercapto-1-methyl (or 1-ethyl, 2-methyl, 2-ethyl, 4-methyl or 4-ethyl)-5-hydroxy-triazoles-(1,2,4).

The preparative process variants are preferably carried out with conjoint use of a suitable solvent or diluent. Practically all inert organic solvents can be used for this purpose, especially aliphatic and aromatic, optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, for example acetone, methyl ethyl ketone, methyl isopropyl ketone and methyl isobutyl ketone; and nitriles, such as acetonitrile and propionitrile.

All customary acid-acceptors can be used as acid-binding agents. Alkali metal carbonates and alkali metal alcoholates, such as sodium carbonate and potassium carbonate, sodium methylate and ethylate and potassium methylate and ethylate, and also aliphatic, aromatic or heterocyclic amines, for example triethylamine, dimethylamine, dimethylaniline, dimethylbenzylamine and pyridine, have proved particularly successful.

The reaction temperature can be varied over a fairly wide range. In general, the reaction is carried out at about 0° to 150°C, preferably at about 30° to 90°C.

The reaction is generally allowed to take place under normal pressure.

In carrying out the process according to the invention, the starting materials are generally employed in equivalent amounts and only the phosgene in process variant (b) is used in excess. The first stage of process variant (b) is preferably carried out at a pH value below 7 and the first stage of process variant (c) preferably at a pH value of about 8.

The working-up of the reaction mixture is effected in the usual manner by filtration, drying and distillation or recrystallization.

The compounds according to the invention are in part obtained in the form of slightly colored oils which in most cases cannot be distilled without decomposition but can be freed of the last volatile constituents by so-called "slight distillation," that is to say by prolonged heating under reduced pressure to moderately elevated temperatures, and be purified in this way. They are characterized by the refractive index. The compounds obtained in a crystalline form are characterized by their melting points.

As already mentioned, the N,N-dimethyl-O-triazolyl-carbamic acid esters according to the invention are distinguished by an excellent insecticidal and acaricidal activity towards plant pests. They combine a low phytotoxicity with a good action against both sucking and biting insects and against mites (Acarina).

To the sucking insects there belong, in the main, aphids (Aphididae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius = Calandra granaria*), the colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acarina) there are classed, in particular, the spider mites (Tetranychidae) such as the two-spotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against pests harmful to health and pests of stored products particularly flies and mosquitoes, the present compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.0001 and 10%, preferably 0.01 and 1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001 and 95%, and preferably 0.01 and 95%, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50 to 100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

Furthermore, the present invention contemplates methods of selectively killing, combating or controlling pests, e.g., insects and acarids, which comprises applying to at least one of correspondingly (a) such insects, (b) such acarids, and (c) the corresponding habitat thereof, i.e., the locus to be protected, a correspondingly combative or toxic amount, i.e., an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples.

EXAMPLE 1

Phaedon larvae test
Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) were sprayed with the preparation of the active compound until dripping wet and were then infested with mustard beetle larvae (*Phaedon cochleariae*).

After the specified period of time, the degree of destruction was determined in %: 100% means that all of the beetle larvae were killed whereas 0% means that none of the beetle larvae were killed.

The active compounds, the concentrations of the active compounds, the evaluation times and the results can be seen from the following table:

Table 1

(insects which damage plants)

Phaedon larvae test

| Active compounds | Active compound concentration in % | Degree of destruction in % after 3 days |
|---|---|---|
| 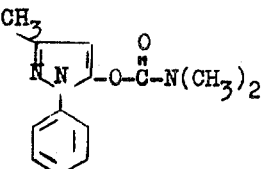 (known) (A) | 0.1<br>0.01 | 100<br>0 |
| 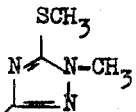 (8) | 0.1<br>0.01 | 100<br>100 |
| 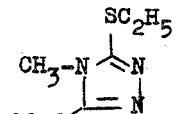 (2) | 0.1<br>0.01 | 100<br>95 |

EXAMPLE 2

Myzus test (contact action)
Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following table:

Table 2

(insects which damage plants)

Myzus test

| Active compounds | Active compound concentration in % | Degree of destruction in % after 1 day |
|---|---|---|
| 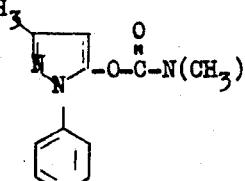 (known) (A) | 0.1<br>0.01 | 98<br>0 |
| 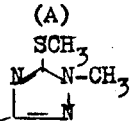 | 0.1<br>0.01<br>0.001 | 100<br>100<br>98 |

Table 2 (continued)

(insects which damage plants)

Myzus test

| Active compounds | Active compound concentration in % | Degree of destruction in % after 1 day |
|---|---|---|
| 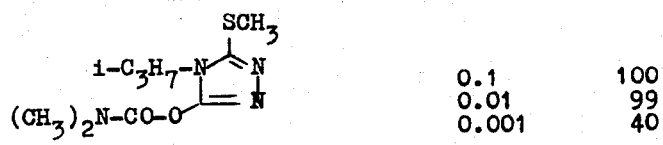 (7) | 0.1<br>0.01<br>0.001 | 100<br>99<br>40 |
| 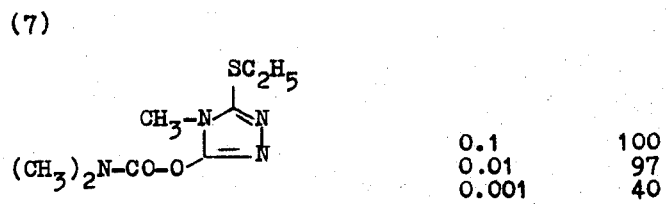 (2) | 0.1<br>0.01<br>0.001 | 100<br>97<br>40 |
| 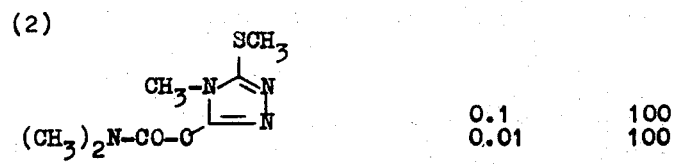 (1) | 0.1<br>0.01 | 100<br>100 |
| 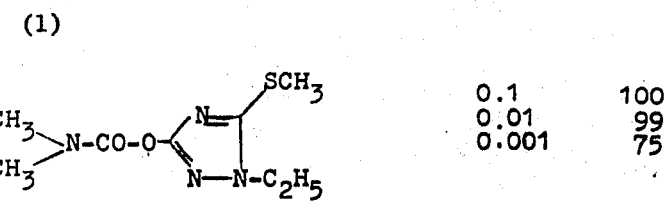 (6) | 0.1<br>0.01<br>0.001 | 100<br>99<br>75 |
| 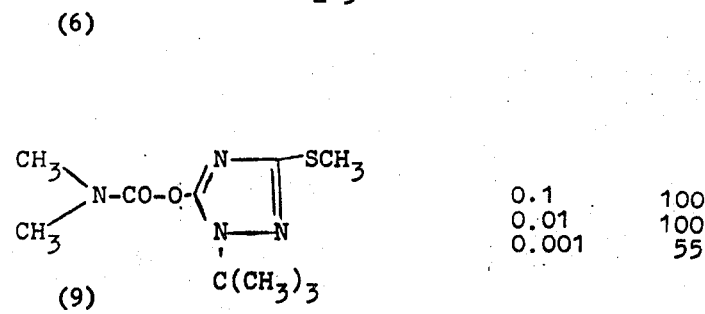 (9) | 0.1<br>0.01<br>0.001 | 100<br>100<br>55 |

EXAMPLE 3

Tetranychus test (resistant)
Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10 - 30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained is expressed as a percentage: 100% means that all the spider mites were killed whereas 0% means that none of the spider mites were killed.

The active compounds, the concentrations of the active compounds, the evaluation times and the results can be seen from the following table:

Table 3

(mites which damage plants)

Tetranychus test

| Active compounds | Active compound concentration in % | Degree of destruction in % after 2 days |
| --- | --- | --- |
| 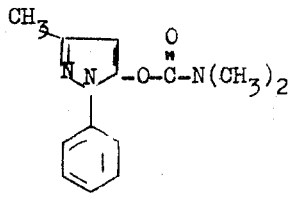 (known) (A) | 0.1 | 0 |
| 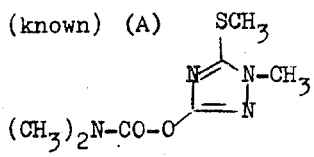 (8) | 0.1 | 98 |

The preparation of the compounds according to this invention is illustrated in the following Examples.

EXAMPLE 4

The preparation of the triazole derivatives used as starting compounds was effected as follows:

a) 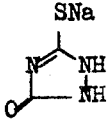

165 g of pyrocarbonic acid diethyl ester were added to 91 g (1 mole) of thiosemicarbazide in 300 ml of methanol under reflux, the mixture was boiled for 3 hours under reflux, 1 mole of sodium methylate was then added and the mixture was heated for a further 8 hours. Thereafter, the reaction solution was cooled and the residue was filtered off and dried on clay. 120 g (86% of theory) of the desired sodium salt, of melting point above 250°C, were obtained.

b) 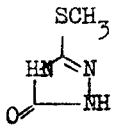

23 g (0.2 mole) of the sodium salt described under A (1) were added to a solution of 24 g of potassium hydroxide in 100 ml of water, and 26 g of dimethylsulphate were then added, whereupon an exothermic temperature rise occurred. The reaction solution was stirred for 2 hours, 20 ml of concentrated pure hydrochloric acid were added and the precipitate was filtered off and dried. 100 g (76% of theory) of a product melting at 186°C were thus obtained.

c) 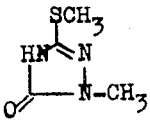

13 g (0.1 mole) of the 3-methylmercapto-1,2,4-triazolone-(5) obtained under 4(b) and 12 g of potassium hydroxide in 100 ml of water were treated with 12.6 g of dimethylsulfate and stirred for 2 hours. After cooling, the mixture was acidified with hydrochloric acid and the residue was filtered off, dried and recrystallized from acetonitrile. 79 g (48% of theory) of 1-methyl-3-methylmercapto-1,2,4-triazolone-(5) of melting point 174°–175°C were obtained.

d) 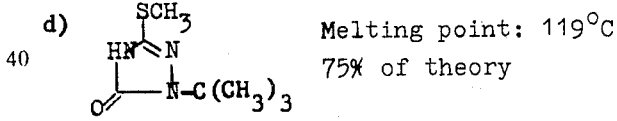

Melting point: 119°C
75% of theory was obtained as in (c) using 21 g of di-tert. butylsulfate.

EXAMPLE 5 a) 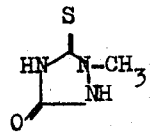

35 g (0.2 mole) of the compound 35 g (0.2 mole) of the compound

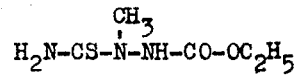

(prepared from methylthiosemicarbazide and pyrocarbonic acid diethyl ester; melting point 107°C) and 0.2 mole of sodium methylate in 100 ml of methanol were heated under reflux for 5 hours and subsequently evaporated in vacuo. The residue was dissolved in water and precipitated with hydrochloric acid, and 17 g (65% of theory) of the compound melting point 250°C were thus obtained.

b) Analogously,

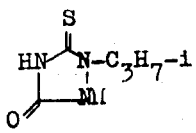 Melting point 228°C
96 g = 60% of theory was obtained from the compound $$\underset{\underset{H_2N-CS-N-NH-CO-OC_2H_5}{|}}{C_3H_7-i}$$

(prepared from N-isopropylcarbonic acid ethyl ester hydrazide and potassium thiocyanate; melting point 168°C).

c) 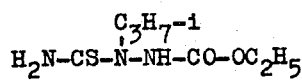 Melting point 222°C
332 g = 76% of theory was obtained from $$\underset{\underset{\dot{C}_2H_5}{|}}{H_2N-CS-N-NH-CO-OC_2H_5}$$

(prepared from N-ethyl-carbonic acid ethyl ester hydrazide and potassium thiocyanate; melting point 133°C).

d) 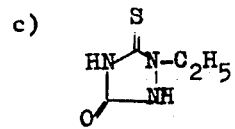 Melting point 168-170°C
94 g = 59% of theory was obtained from i—C$_3$H$_7$—NH—CS—NH—NH—CO—OC$_2$H$_5$

EXAMPLE 6 a) 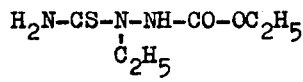

13.1 g (0.1 mole) of the 2-methyl-3-thiono-1,2,4-triazolidone-(5) obtained in Example 5a and 6 g of potassium hydroxide were dissolved in 50 ml of water and 126 g of dimethylsulfate were added. The reaction solution was stirred for 2 hours at 25°C, extracted with methylene chloride and worked up in the usual manner. 143 g (98% of theory) of 2-methyl-3-methylmercapto-triazolone-(5) of melting point 130°C were obtained.

The following were prepared analogously;

b) 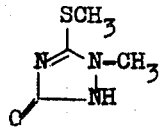 Melting point 94°C
Yield: 60% of theory c) 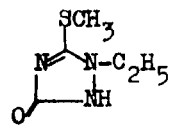 Melting point 91-93°C
Yield: 33% of theory d) 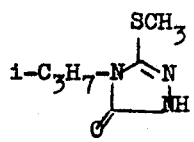 Melting point 118°C
80 g = 93% of theory

EXAMPLE 7 a) 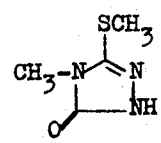

724 g (4.1 moles) of the compound

CH$_3$—NH—CS—NH—NH—CO—OC$_2$H$_5$ (obtained from methylthiosemicarbazide and pyrocarbonic acid diethyl ester; melting point 127°C) were mixed, at 60°C, with 4.1 moles of sodium methylate in 500 ml of methanol and the mixture was boiled for 5 hours. 515 g of dimethylsulfate were then added at 30°–35°C, the reaction solution was again heated for 3 hours to complete the reaction and was then evaporated, and the residue was washed with water and dried. 444 g (75% of theory) of 3-methylmercapto-4-methyl-1,2,4-triazolone-(5) of melting point 79°–80°C were thus obtained.

b. The following compound was prepared analogously, using diethylsulfate:

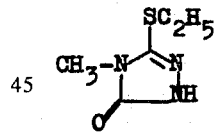 Melting point 88°C
55% of theory

EXAMPLE 8 a) 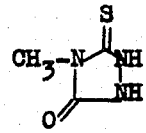

89 g (0.5 mole) of the compound

CH$_3$—NH—CS—NH—NH—CO—OC$_2$H$_5$ (obtained from methylthiosemicarbazide and pyrocarbonic acid diethyl ester; melting point 127°C) in 300 ml of methanol and 0.5 mole of sodium methylate were heated for 5 hours under reflux and the sodium salt which separated out was filtered off, dissolved in a little water and the solution precipitated with the calculated amount of concentrated hydrochloric acid. 39 g (60% of theory) of 4-methyl-3-thiono-triazolidinone-(5) of melting point 217°C were obtained.

b) 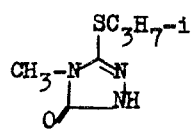

92 g of the sodium salt of the compound obtained in (a), in 50 ml of acetonitrile, and 102 g of isopropyl iodide were heated for 5 hours under reflux. Thereafter, the reaction solution was evaporated and the residue was washed with water and dried. 63 g (61% of theory) of 3-isopropylmercapto-4-methyl-1,2,4-triazolone-(5) of melting point 78°C were thus obtained.

EXAMPLE 9

$$\underset{(CH_3)_2N-CO-O}{\overset{SCH_3}{\underset{CH_3-N}{\bigvee}}} \quad (1)$$

15 g (0.1 mole) of 3-methylmercapto-4-methyl-5-hydroxytriazole-(1,2,4), i.e., the keto form of the product of Example 7a, 15 g of potassium carbonate and 11 g of N,N-dimethylcarbamic acid chloride in 100 ml of acetonitrile were warmed to 80°C for 4 hours. Thereafter, the reaction solution was cooled and filtered and the solvent was distilled off. The easily volatile constituents were stripped off the residue under reduced pressure, whereby 17 g (79% of theory) of N,N-dimethyl-O-[3-methylmercapto-4-methyl-1,2,4-triazolyl(5)]-carbamic acid ester were obtained as an oil of refractive index $n_D^{24}$ of 1.5468. The oil solidified and the crystals then had a melting point of 42°C.

The following compounds were prepared analogously from the indicated starting materials:

| Compound No. | Formula | Starting Material, Example No. | Physical properties (refractive index: melting point) | Yield (% of theory) |
|---|---|---|---|---|
| (2) | (structure with SC$_2$H$_5$) | 7b | 71°C | 87 |
| (3) | (structure with SC$_3$H$_7$-i) | 8b | $n_D^{20}$ : 1.5320 | 90 |
| (4) | (structure with SCH$_3$, N-C$_3$H$_7$-i) | 6b | 64°C | 86 |
| (5) | (structure with SCH$_3$, N-CH$_3$) | 4c | $n_D^{25}$ : 1.5100 | 78 |
| (6) | (structure with SCH$_3$, N-C$_2$H$_5$) | 6c | 66°C | 74 |
| (7) | (structure with i-C$_3$H$_7$, SCH$_3$) | 6d | $n_D^{23}$ : 1.5302 | 74 |
| (8) | (structure with SCH$_3$, N-CH$_3$) | 6a | 87°C | 86 |
| (9) | (structure with SCH$_3$, N-C(CH$_3$)$_3$) | 4d | 64°C | 39 |

It will be appreciated that the instant specification and examples are set forth by way of illustration and not limitation, and that various modifications and changes may be made without departing from the spirit and scope of the present invention.

What is claimed is:

1. An N,N-dimethyl-O-triazolyl-carbamic acid ester of the formula

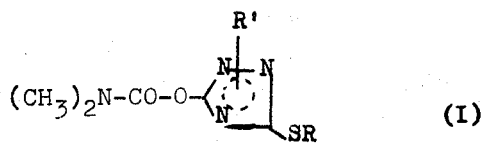 (I)

in which

R and R' each independently is alkyl of 1 to 6 carbon atoms.

2. A compound according to claim 1, in which R is alkyl of 1 to 4 carbon atoms and R' is methyl, ethyl or isopropyl.

3. The compound according to claim 1, wherein such compound is N,N-dimethyl-O-[3-methylmercapto-4-methyl-1,2,4-triazolyl(5)]-carbamic acid ester of the formula

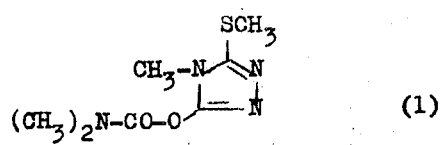 (1)

4. The compound according to claim 1, wherein such compound is N,N-dimethyl-O-[3-ethylmercapto-4-methyl-1,2,4-triazolyl(5)]-carbamic acid ester of the formula

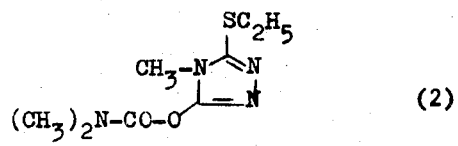 (2)

5. The compound according to claim 1, wherein such compound is N,N-dimethyl-O-[2-isopropyl-3-methylmercapto-1,2,4-triazolyl(5)]-carbamic acid ester of the formula

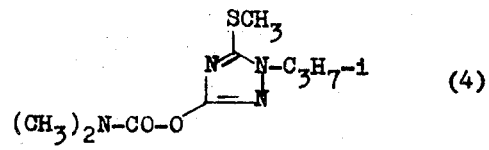 (4)

6. The compound according to claim 1, wherein such compound is N,N-dimethyl-O-[1-methyl-3-methylmercapto-1,2,4-triazolyl(5)]-carbamic acid ester of the formula

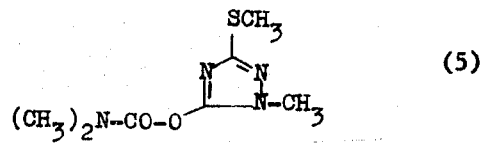 (5)

7. The compound according to claim 1, wherein such compound is N,N-dimethyl-O-[2-methyl-3-methylmercapto-1,2,4-triazolyl(5)]-carbamic acid ester of the formula

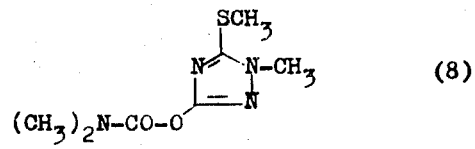 (8)

* * * * *